United States Patent
Wells et al.

(10) Patent No.: US 9,562,822 B2
(45) Date of Patent: Feb. 7, 2017

(54) FLEXIBLE CONTACT ARRANGEMENT FOR HOSE ASSEMBLY

(71) Applicant: Eaton Corporation, Cleveland, OH (US)

(72) Inventors: Michael Paul Wells, Bowling Green, OH (US); James Dean Betsinger, Waterville, OH (US)

(73) Assignee: Eaton Corporation, Cleveland, OH (US)

( * ) Notice: Subject to any disclaimer, the term of this patent is extended or adjusted under 35 U.S.C. 154(b) by 167 days.

(21) Appl. No.: 14/186,501

(22) Filed: Feb. 21, 2014

(65) Prior Publication Data

US 2014/0238109 A1    Aug. 28, 2014

Related U.S. Application Data

(60) Provisional application No. 61/768,325, filed on Feb. 22, 2013.

(51) Int. Cl.
 G01M 3/02 (2006.01)
 F16L 25/01 (2006.01)

(52) U.S. Cl.
 CPC .............. *G01M 3/02* (2013.01); *F16L 25/01* (2013.01)

(58) Field of Classification Search
 CPC ............. G01M 3/02; G01M 3/36; F16L 25/01
 See application file for complete search history.

(56) References Cited

U.S. PATENT DOCUMENTS 2,291,070 A   7/1942 Bruno
2,436,949 A * 3/1948 Anderson .............. H01R 39/00
                                                          174/21 JR
(Continued)

FOREIGN PATENT DOCUMENTS

DE    31 40 804 A1    4/1983
DE    40 30 788 A1    8/1991
(Continued)

OTHER PUBLICATIONS

International Search Report and Written Opinion for Application No. PCT/US2011/061865 mailed May 21, 2012.
(Continued)

*Primary Examiner* — Laura Martin
*Assistant Examiner* — Alex Devito
(74) *Attorney, Agent, or Firm* — Merchant & Gould P.C.

(57) ABSTRACT

An integrated hose assembly, as well as a monitoring assembly and method of its use are disclosed. The integrated hose assembly includes a hose assembly with a hose having a first conductive layer electrically connected to a nipple and a second conductive layer electrically connected to a socket. The first and second conductive layers are separated by an insulating layer. The integrated hose assembly further includes a monitoring assembly that includes a housing rotatably mounted around at least a portion of the hose assembly, a first flexibly resilient conductive lead seated within the housing and electrically contacting a first outer surface of the hose assembly such that the first flexibly resilient conductive lead is electrically connected to a nipple, and a second flexibly resilient conductive lead seated within the housing and electrically contacting a second outer surface of the hose assembly such that the second flexibly resilient conductive lead is electrically connected to a socket. The monitoring assembly includes a monitoring (Continued)

circuit electrically connected to the first flexibly resilient conductive lead and the second flexibly resilient conductive lead.

19 Claims, 10 Drawing Sheets

(56) References Cited

U.S. PATENT DOCUMENTS

| | | | |
|---|---|---|---|
| 4,029,889 A | 6/1977 | Mizuochi |
| 4,229,613 A | 10/1980 | Braun |
| 4,446,892 A | 5/1984 | Maxwell |
| 5,267,670 A | 12/1993 | Foster |
| 5,343,738 A | 9/1994 | Skaggs |
| 5,387,899 A | 2/1995 | DiLauro et al. |
| 5,442,810 A | 8/1995 | Jenquin |
| 5,551,484 A | 9/1996 | Charboneau |
| 5,634,497 A | 6/1997 | Neto |
| 5,671,689 A | 9/1997 | Clapp et al. |
| 5,969,618 A | 10/1999 | Redmond |
| 5,992,218 A | 11/1999 | Tryba et al. |
| 6,384,611 B1 | 5/2002 | Wallace et al. |
| 6,386,237 B1 | 5/2002 | Chevalier et al. |
| 6,498,991 B1 | 12/2002 | Phelan et al. |
| 6,735,705 B1 | 5/2004 | Egbert et al. |
| 6,958,615 B2 | 10/2005 | Poulbot et al. |
| 7,555,936 B2 | 7/2009 | Deckard |
| 8,087,430 B1 | 1/2012 | Betz et al. |
| 8,183,872 B2 | 5/2012 | Stark |
| 8,217,669 B1 | 7/2012 | Watkins, Jr. |
| 8,515,687 B2 | 8/2013 | Pereira et al. |
| 8,829,929 B1 | 9/2014 | Watkns, Jr. |
| 8,997,792 B2 | 4/2015 | Betsinger et al. |
| 2001/0018845 A1 | 9/2001 | Roberts |
| 2002/0154029 A1 | 10/2002 | Watters et al. |
| 2003/0164048 A1 | 9/2003 | Shkel |
| 2004/0065377 A1 | 4/2004 | Whiteley |
| 2005/0253821 A1 | 11/2005 | Roeder |
| 2006/0226701 A1 | 10/2006 | Gatz et al. |
| 2007/0051166 A1 | 3/2007 | Baker et al. |
| 2007/0131035 A1 | 6/2007 | Krutz et al. |
| 2008/0036617 A1 | 2/2008 | Arms et al. |
| 2010/0308575 A1 | 12/2010 | Rodenburg |
| 2011/0152024 A1 | 6/2011 | Kuehl |
| 2011/0226302 A1 | 9/2011 | Farmer et al. |
| 2011/0281488 A1 | 11/2011 | Li |
| 2012/0136592 A1 | 5/2012 | Pereira et al. |
| 2012/0204923 A1 | 8/2012 | Ortiz et al. |
| 2012/0278018 A1 | 11/2012 | Hastreiter |
| 2013/0134992 A1 | 5/2013 | Zhu et al. |
| 2014/0076449 A1 | 3/2014 | Betsinger et al. |
| 2014/0265561 A1 | 9/2014 | Beining |
| 2015/0177172 A1 | 6/2015 | Upasani et al. |
| 2015/0240972 A1 | 8/2015 | Betsinger |
| 2015/0300538 A1 | 10/2015 | Al-Atat et al. |

FOREIGN PATENT DOCUMENTS

| | | |
|---|---|---|
| EP | 1 126 205 A1 | 8/2001 |
| EP | 1 722 217 A1 | 11/2006 |
| EP | 2 261 546 A1 | 12/2010 |
| GB | 1574749 | 9/1980 |
| JP | 2011027216 A | 2/2011 |
| WO | WO 03/079749 A2 | 10/2003 |
| WO | WO 2008/001238 A2 | 1/2008 |
| WO | WO 2008/059226 A2 | 5/2008 |
| WO | WO 2011/143384 A1 | 11/2011 |
| WO | WO 2012/012482 A1 | 1/2012 |
| WO | WO 2012/071424 A2 | 5/2012 |
| WO | WO 2012/149161 A1 | 11/2012 |

OTHER PUBLICATIONS

International Search Report and Written Opinion for Application No. PCT/US2012/035216 mailed Jul. 16, 2012.
International Search Report for Application No. PCT/IN2012/000296 mailed Nov. 27, 2012.
International Search Report for Application No. PCT/US2013/030966 mailed Aug. 1, 2013.
Invitation to Pay Additional Fees with Partial International Search for Application No. PCT/US2013/048660 mailed Mar. 24, 2014.
International Search Report and Written Opinion for Application No. PCT/US2013/048660 mailed Sep. 8, 2014.
International Search Report for Application No. PCT/US2013/059465 mailed Dec. 3, 2013.
Invitation to Pay Additional Fees with Partial International Search for Application No. PCT/US2013/059473 mailed Feb. 28, 2014.
International Search Report and Written Opinion for Application No. PCT/US2013/059473 mailed Jul. 18, 2014.
International Search Report and Written Opinion for Application No. PCT/US2014/029286 mailed Jun. 18, 2014.
Holland, Z. et al., "Layered Polymer Whole Structure Health Monitoring Using Capacitance Sensing", *IEEE/ASME International Conference on Advanced Intelligent Mechatronics*, Montreal, Canada, Jul. 6-9, 2010, pp. 943-946.
Radtke et al., Design of Power-Transmitting Hydraulic Hose with Integrated Controller Area Network and Life-Sensing Capability, 2005 Agricultural Equipment Technology Conference, Feb. 15, 2005.
Hewlett Packard Technical Manual, printed Apr. 24, 2003, 8 Pages.
Guo, Z. et al., "GRE: Graded Residual Energy Based Lifetime Prolonging Algorithm for Pipeline Monitoring Sensor", *9th International Conference on Parallel and Distributed Computing Applications and Technologies*, 203-210 (2008).
Mohamed, M. et al., "Power Harvesting for Smart Sensor Networks in Monitoring Water Distribution System", *International Conference on Networking, Sensing and Control*, 393-398 (2011).
Ok, C. et al., "Optimal Transmission Power in Self-sustainable Sensor Networks for Pipeline Monitoring", *IEEE International Conference on Automation Science and Engineering*, 591-596 (2007).
International Search Report and Written Opinion for PCT/US2014/017590 mailed Jun. 3, 2014.
International Search Report and Written Opinion for Application No. PCT/US2014/017590 mailed Jun. 3, 2014.
European Search Report for Application No. 12875245.8 mailed Dec. 15, 2015.

* cited by examiner

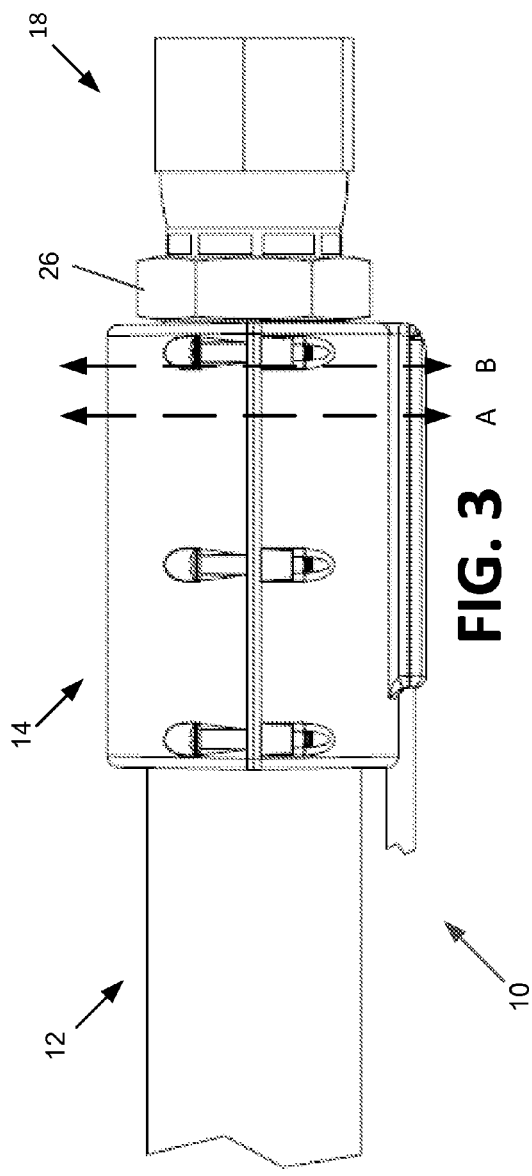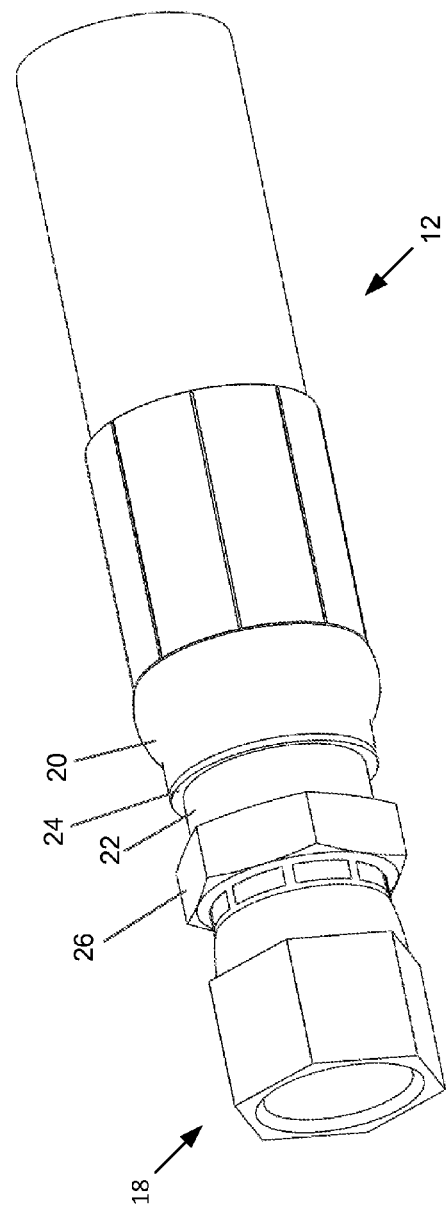

FLEXIBLE CONTACT ARRANGEMENT FOR HOSE ASSEMBLY

CROSS-REFERENCE TO RELATED APPLICATIONS

The present application claims priority from U.S. Provisional Patent Application No. 61/768,325, filed on Feb. 22, 2013, the disclosure of which is hereby incorporated by reference in its entirety.

TECHNICAL FIELD

The present application relates generally to a hose assembly, and in particular to an electrical contact arrangement for a hose assembly. Specifically, the present application relates to a flexible electrical contact arrangement for a hose assembly.

BACKGROUND

High pressure reinforced hydraulic hose is typically used on a variety of fluid power operated machines to provide a flexible connection between several moving parts of a hydraulic circuit employed on or within the machine. Such hoses may include a hollow polymeric inner tube on which successive cylindrical layers of reinforcing material, such as wire or textile, are concentrically applied to contain the radial and axial pressures developed within the inner tube.

Many applications are demanding hose constructions with both high burst strength and long term fatigue resistance. Using conventional technology, the burst strength of a hose may be increased by adding additional reinforcing material and/or layers, a practice which is generally discouraged because of its negative impact on the flexibility of the hose, or by universally increasing the tensile strength of each layer of reinforcement material, which may come at the expense of hose fatigue resistance.

To determine the robustness of a hose design, a hose manufacturer typically performs, among other tests, an impulse test and a burst test on the hose. An impulse test measures a hose design's resistance to fatigue failure by cyclically subjecting the hose to hydraulic pressure. A burst test, on the other hand, is a destructive hydraulic test employed to determine the ultimate strength of a hose by uniformly increasing internal pressure until failure. Based on these and other tests, a manufacturer can estimate a hose life that can be used to determine when a hose has reached the end of its life and may require replacing.

In some circumstances, it is desirable to detect, in a non-destructive and non-disruptive manner, a likelihood of failure of a hydraulic hose. One solution providing this capability is discussed in U.S. Pat. No. 7,555,936, and discloses connecting a monitor circuit between two parallel, at least partially-conductive layers of a hose wall. A change in an electrical property observed by that monitor circuit may indicate a change in a property of the hose wall structure that might indicate impending failure of the hose wall.

To determine whether changes in electrical properties of a hose assembly have occurred, an electrical circuit is applied to the conductive layers of the hose wall. This may be accomplished through use of spring-style contacts, or by otherwise pressing electrical contacts into the hose wall at a location where the conductive layer of interest is exposed. However, such arrangements have drawbacks.

For example, in the case of spring-style contacts, it can be difficult to obtain a reliable electrical connection between the contacts associated with the electrical circuit and the hose layers. Vibrations or stress on the hose can cause damage to these contacts as well, which may wear the contacts quickly. Additionally, due to exposure to environmental conditions (heat, cold, moisture, dirt, etc.), spring-type electrical contacts can corrode or otherwise have their electrical connection interrupted by debris, thereby weakening or disrupting the connection between the electrical circuit and the conductive layer of the hose. Additionally, it can be difficult to maintain a reliable electrical connection between the contacts associated with the electrical circuit and the hose layers if there is an inconsistency in the socket shape or the distance between the hose fitting and the housing of the monitoring assembly. For example, electrical contacts can lose electrical connection if the radius between the hose fitting and the housing of the monitoring assembly is not calculated with precision or if this radius changes due to wear and/or use. These problems with existing contacts can cause electrical disconnection of the electrical circuit from the conductive layers, thereby either triggering a fault in the circuit or falsely detecting degradation of the hose itself.

For these and other reasons, improvements are desirable.

SUMMARY

In accordance with the following disclosure, the above and other issues are addressed by the following:

In a first aspect, an integrated hose assembly includes a hose assembly with a hose having a first conductive layer and a second conductive layer, the first conductive layer electrically connected to a nipple and the second conductive layer electrically connected to a socket. The first and second conductive layers are separated by an insulating layer. The integrated hose assembly further includes a monitoring assembly that includes a housing that is rotatably mounted around at least a portion of the hose assembly, a first flexibly resilient conductive lead seated within the housing and electrically contacting a first outer surface of the hose assembly such that the first flexibly resilient conductive lead is electrically connected to a nipple, and a second flexibly resilient conductive lead seated within the housing and electrically contacting a second outer surface of the hose assembly such that the second flexibly resilient conductive lead is electrically connected to a socket. The monitoring assembly further includes a monitoring circuit electrically connected to the first flexibly resilient conductive lead and the second flexibly resilient conductive lead.

In a second aspect, a monitoring assembly includes a housing that is rotatably mountable around at least a portion of a hose assembly having first and second electrically conductive outer surfaces forming contact points for an electrical circuit including the hose assembly. The monitoring assembly also includes a first flexibly resilient conductive lead seated within the housing and electrically contacting a first outer surface of the hose assembly such that the first flexibly resilient conductive lead is electrically connected to a nipple, and a second flexibly resilient conductive lead seated within the housing and electrically contacting a second outer surface of the hose assembly such that the second flexibly resilient conductive lead is electrically connected to a socket. The monitoring assembly also includes a monitoring circuit electrically connected to the first flexibly resilient conductive lead and the second flexibly resilient conductive lead.

A third aspect is a method of contacting a monitoring assembly to a hose assembly. The method includes rotatably mounting a housing of a monitoring assembly around at least a portion of a hose assembly, thereby electrically contacting a first electrically conductive outer surface of the hose assembly with a first flexibly resilient conductive lead and electrically contacting a second electrically conductive outer surface of the hose assembly with a second flexibly resilient conductive lead, the first and second flexibly resilient conductive leads each electrically connected to a monitoring circuit within the housing.

BRIEF DESCRIPTION OF THE DRAWINGS

FIG. 3 is a bottom perspective view of the integrated hose assembly of FIG. 1;

FIG. 4 is a perspective view of the integrated hose assembly of FIG. 1 with the monitoring assembly removed;

DETAILED DESCRIPTION

Figure 1:
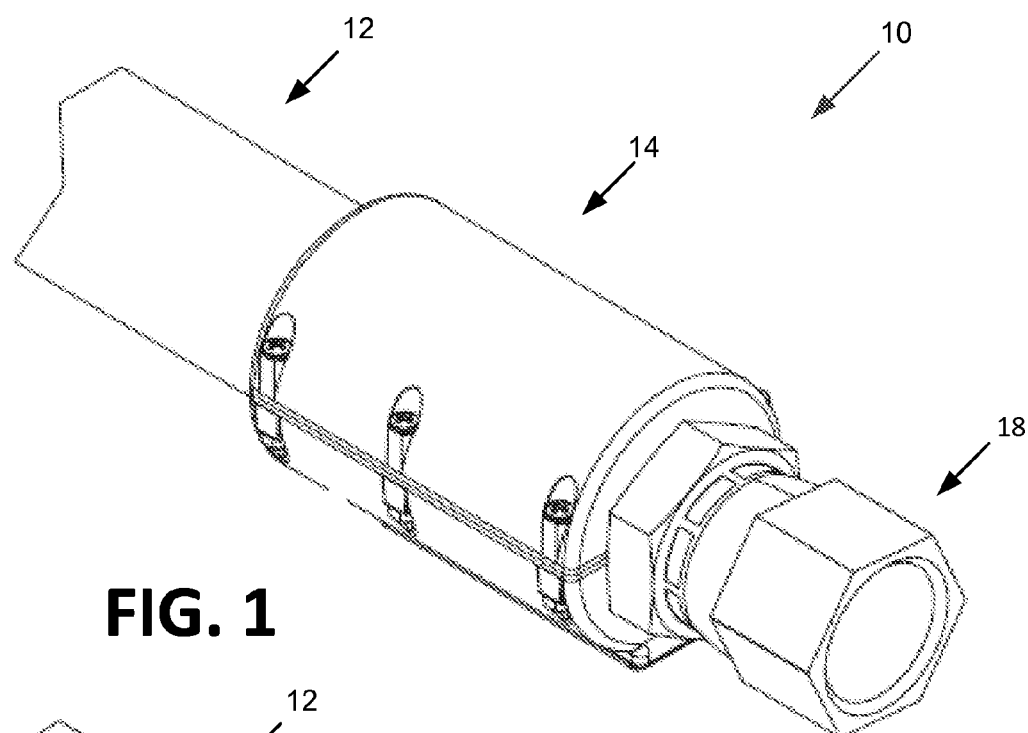
FIG. 1 is a top perspective view of an integrated hose assembly having a monitoring assembly mounted to a hose assembly, according to an example embodiment.

Various embodiments of the present invention will be described in detail with reference to the drawings, wherein like reference numerals represent like parts and assemblies through the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general the present disclosure relates to a flexibly resilient conductive lead arrangement, such as could be used in a failure monitoring assembly for a hose assembly. The flexibly resilient conductive lead arrangement disclosed herein generally provides for continuous contact along a conductive surface, thereby ensuring that reliable electrical contact is maintained between the flexibly resilient conductive lead and a conductive component or conductive concentric layer of a hose or other cylindrical object. Using the flexibly resilient conductive lead arrangement in particular in outdoor or other environmentally-exposed applications provides other advantages; by using such leads in a housing rotatably mounted to a hose or cylindrical surface, physical rotation of the flexibly resilient conductive lead causes an abrasive effect between the lead and the surface it contacts, thereby scraping dirt or other debris away from a metallic or other conductive surface and improving the electrical interconnection between that surface and the lead. A further advantage of the flexibly resilient conductive lead arrangement is that the leads may be biased into electrical contact with a conductive component or a conductive concentric layer of a hose or other cylindrical object that is not a set distance away. The flexibly resilient leads can compensate for any changes in the distance away from the conductive material resulting from extended use and/or wear or manufacturing tolerance errors.

Figure 2:
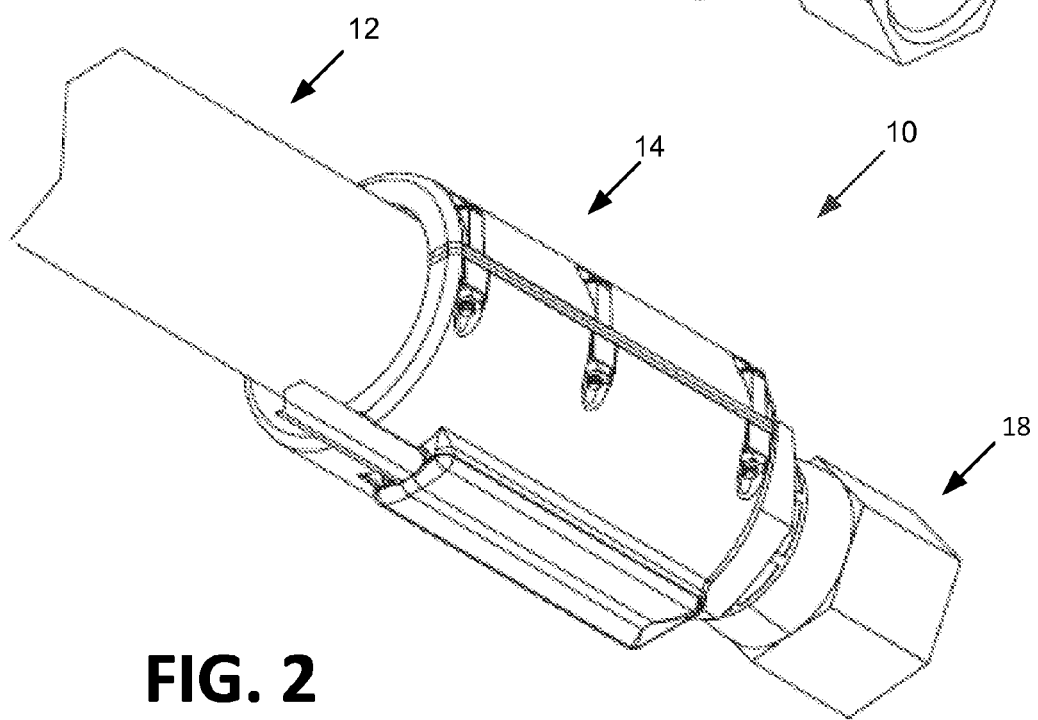
FIG. 2 is a bottom perspective view of the integrated hose assembly of FIG. 1.

Referring now to FIGS. 1-3, an integrated hose assembly 10 is illustrated that includes a hose assembly 12 and a monitoring assembly 14. The hose assembly 12 generally includes a hose having a connectorized end 18. The connectorized end 18 generally includes a nipple and socket arrangement configured to form a hydraulic seal with a complementary connector. Other connectorization arrangements are also possible.

In the embodiment shown, the hose represents a hydraulic hose; in other embodiments, other applications or types of hoses could be used. Example embodiments of the hose assembly with which failures can be detected via monitoring of electrical properties of a hose are illustrated in connection with FIGS. 7-9, below. Generally, the embodiments of hose assemblies described below include a plurality of conductive layers that allow for remote electronic monitoring of the continuity or physical condition of the hose by detecting various electrical response conditions when voltage is applied across the conductive layers.

In the embodiment shown, the monitoring assembly 14 is generally shaped as a hollow cylindrical collar sized to be fit around an area proximate to a connectorized end 18 of the housing. Generally, the monitoring assembly 14 includes a housing 15 constructed from housing portions 15*a-b* that, when interconnected, forms a generally hollow cylindrical arrangement having an internal diameter sized to fit around a hose without axial movement along the hose, while allowing rotational movement of the assembly. This may be accomplished, for example, by locating the monitoring assembly 14 at an area of the hose having a variety of external diameters, such as near the connectorized end 18. As seen in FIGS. 1-3 and FIGS. 5-6, the monitoring assembly 14 can be constructed from a plurality of component pieces 15*a-b* and screwed together around the hose assembly; in other embodiments, different interconnection structures could be used. One alternative of such a monitoring assembly is disclosed in U.S. patent application Ser. No. 13/458,691, filed on Apr. 27, 2012, and entitled "Degradation Monitoring System for Hose Assembly", the disclosure of which is hereby incorporated by reference in its entirety.

Figure 6:
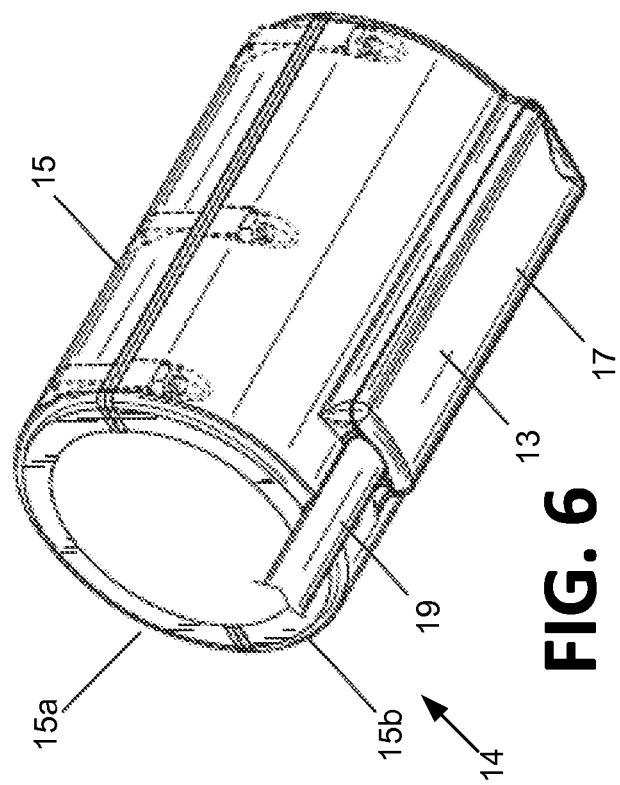
FIG. 6 is a rear perspective view of the monitoring assembly of FIG. 5.
Figure 5:
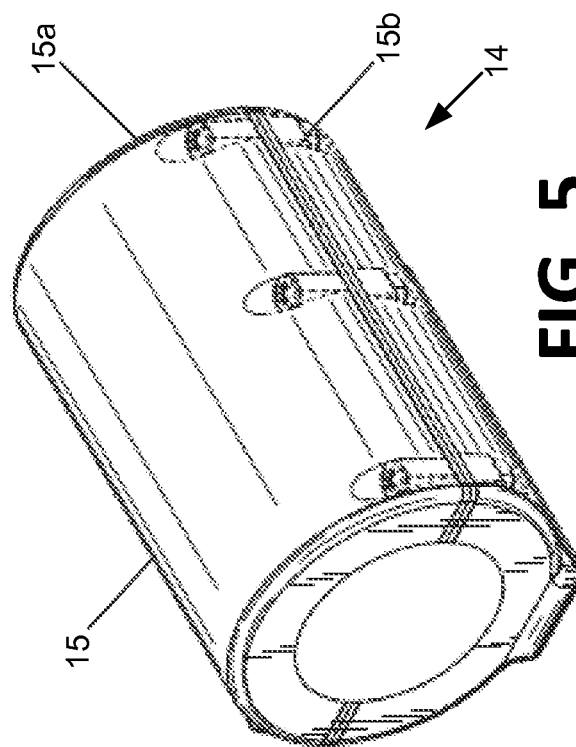
FIG. 5 is a front perspective view of the monitoring assembly, according to an example embodiment.

As seen in FIG. 6, in the example embodiment shown, the housing 15 has a circuit module 13 formed thereon having removable cover 17 that, when removed, allows access to a monitoring circuit. In the embodiment shown, the monitoring circuit is a wired circuit, and a wire 19 extending therefrom. In alternative embodiments, a wireless arrangement could be used.

As seen in FIG. 4, the monitoring assembly 14 can be affixed around an area of the hose having a tapered section 20 and a narrowed extension 22, each of which are generally circular in cross-sectional shape, and which have differing diameters. By affixing the monitoring assembly 14 at such a location, the assembly can be rotated once mounted on the hose assembly 12, but will not move axially along the hose. As illustrated in FIG. 4, the tapered section 20 and narrowed extension 22 are separated by an insulating layer 24 positioned therebetween, which acts to electrically isolate the separate portions of the tapered section 20 and the narrowed extension 22. A rotatable hexagonal nut 26 can be located toward the connectorized end 18 from the narrowed section.

In the embodiment shown in FIG. 4, the tapered section 20 and the narrowed extension 22 of the hose assembly 12 are each electrically conductive, and can be used to electrically connect to different conductive layers within the hose assembly 12 to an electrical circuit within the monitoring assembly 14. As such, electrical connection to the tapered section 20 and the narrowed extension 22 provides electrical interconnection to the conductive layers of the hose assembly 12.

Figure 7:
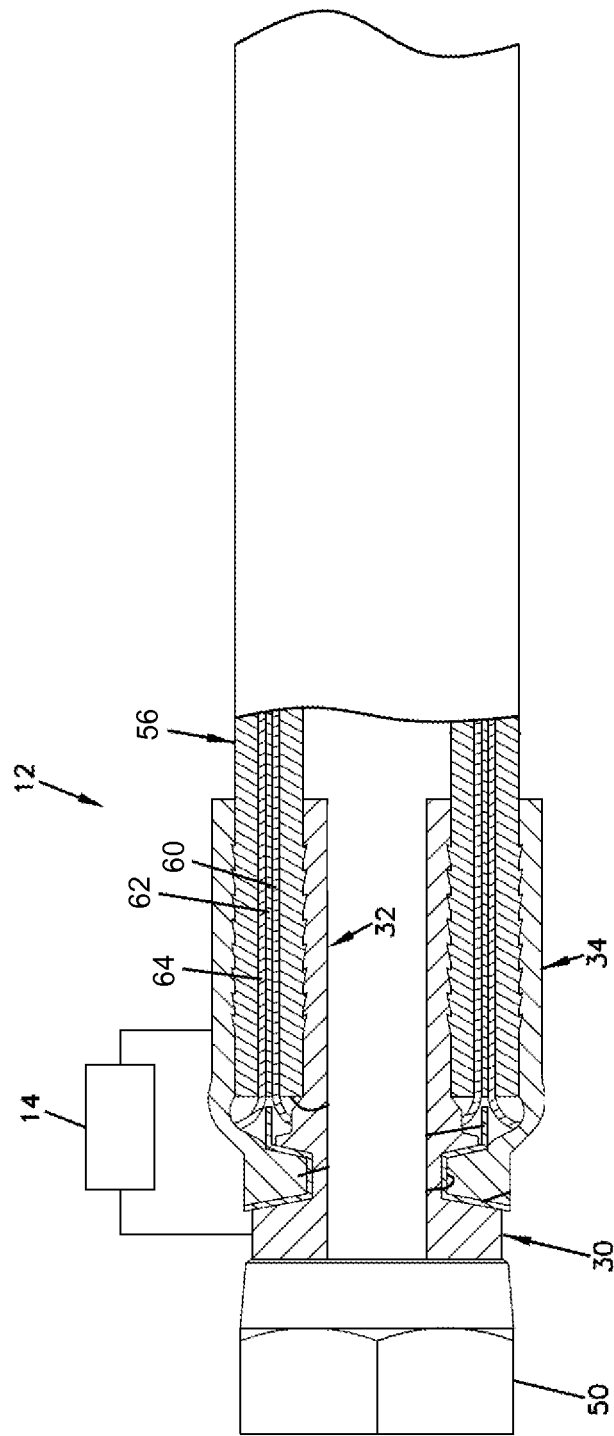
FIG. 7 is a schematic view of a hose assembly, according to an example embodiment.

Referring to FIG. 7, the hose assembly 12 includes a hose, generally designated 56, having a multi-layer construction. In the subject embodiment, the hose 56 is generally flexible and includes an inner tube 58 made from a polymeric material, such as rubber or plastic, or another material depending on the requirements of the particular application, a first conductive layer 60, an intermediate layer 62, a second conductive layer 64 and an outer cover 66. The first and second conductive layers 60, 64 define an electrical characteristic of the hose assembly 12, such as capacitance, inductance and/or resistance (impedance).

In the subject embodiment, the first conductive layer 60 overlays the inner tube 18 and the intermediate layer 62 overlays the first conductive layer 60. The second conductive layer 64 overlays the intermediate layer 62. The first and second conductive layers 60, 64 may be configured as reinforcing layers. The outer cover 66 may overlay the second conductive layer 64, and may include, for example, an extruded layer of rubber or plastic. The outer cover 66 may itself include a reinforcing layer.

The hose assembly 12 may include a hose fitting, generally designated 30, for fluidly coupling the hose assembly to another component. The hose fitting 30 may have any of a variety of different configurations depending, at least in part, on the requirements of the particular application. In the embodiment shown, the hose fitting 30 includes a nut 50 rotatably attached to the nipple 32. The nut 50 provides a means for securing the hose assembly 12 to another component.

In FIG. 7, the monitoring assembly 14 is illustrated schematically as connected to the tapered section 20 and the narrowed extension 22 surfaces. The monitoring assembly 14 may have any of a variety of configurations. In general, the monitoring assembly 14 is connectable over a portion of the hose assembly 12, in particular the portion illustrated in FIGS. 1-3. The monitoring assembly 14, when installed over hose assembly 12, forms a physical and electrical connection with the hose assembly 12, and in particular to nipple 32 and socket 34, respectively, at surfaces 22 and 20, respectively. Generally, the monitoring assembly 14 includes a circuit capable of detecting an electrical characteristic of the hose assembly 12, while validating the connection to the nipple 32 and socket 34.

The intermediate layer 62 operates to at least partially insulate electrically the first and second conductive layers 60, 64 from one another. The intermediate layer 62 may have any of a variety of constructions. For example, the intermediate layer 62 may consist of a single layer of an electrically resistive material. The intermediate layer 62 may also consist of multiple layers, wherein at least one of the layers exhibits electrical insulating properties. Certain composite materials may also be employed in the intermediate layer 62, such as a woven fabric bonded to a polymeric material. Composite materials having various other constructions may also be utilized. Composite materials may also be used in combination with other materials to form the intermediate layer 62. In some embodiments of the present disclosure, the insulating layer 24 represents an exposed portion of the intermediate layer 62; however, in alternative embodiments, the insulating layer can be an insert or other structure separating the conductive layers 60, 64. Generally, the conductive layers 60, 64 electrically connect to the tapered section 20 and narrowed extension 22, respectively.

The first and second conductive layers 60, 64 generally extend the entire length and span the entire circumference of the hose. This is generally the case when the conductive layer also functions as a reinforcement layer. The intermediate layer 62 may also extend over the entire length and circumference of the hose. There may be instances, however, where at least one of the first and second conductive layers 60, 64 extends only over a portion of the hose length and/or a portion of its circumference. In that instance, the intermediate layer 62 may also be configured to generally extend over the region of the hose containing the partial conductive layer 60, 64. The partial intermediate layer 62 may be positioned within the hose so as to separate the first and second conductive layers 60, 64 from one another.

Figure 8:
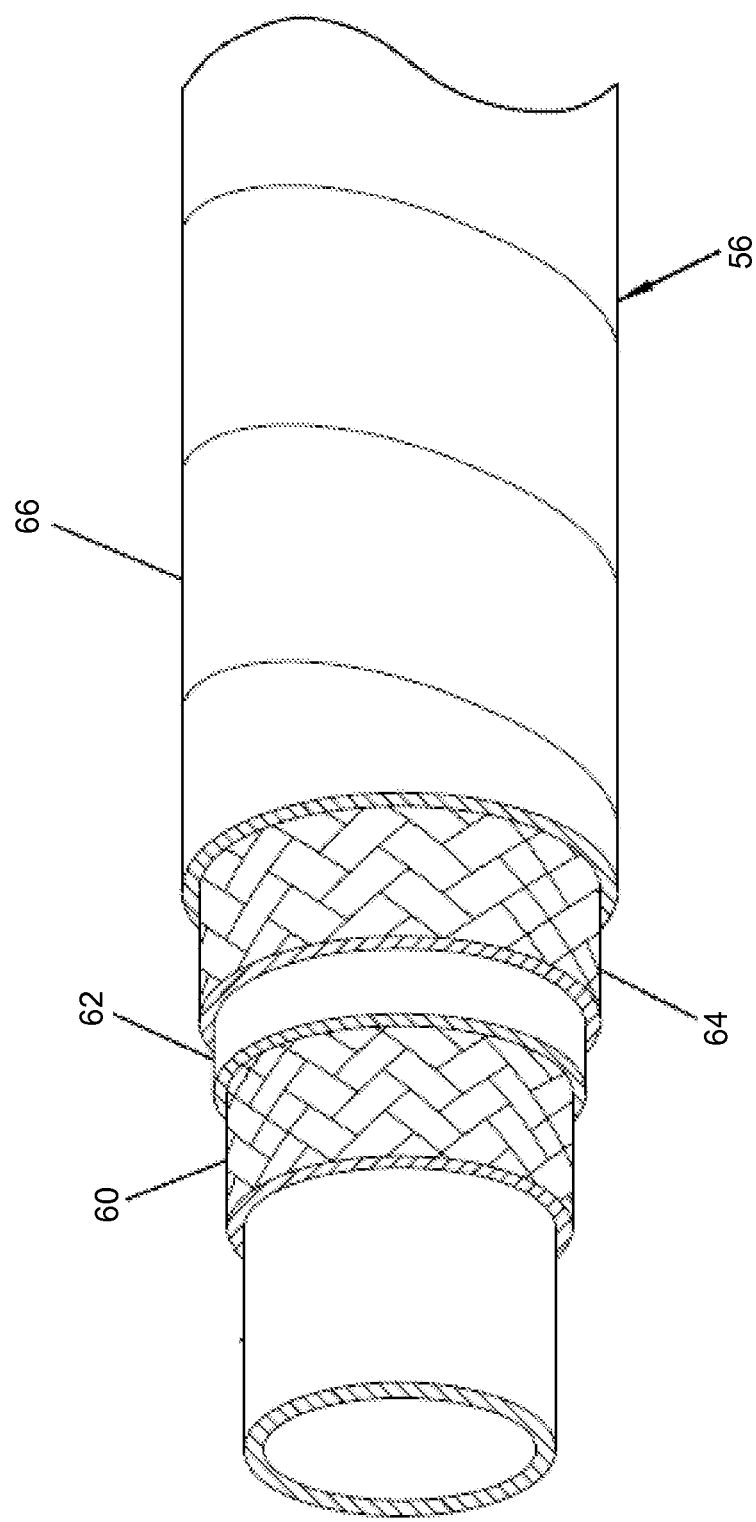
FIG. 8 is a perspective view, partially cut away, illustrating an exemplary hose employing a spiral wire conducting layer that is suitable for use with the hose assembly of FIG. 7.
Figure 9:
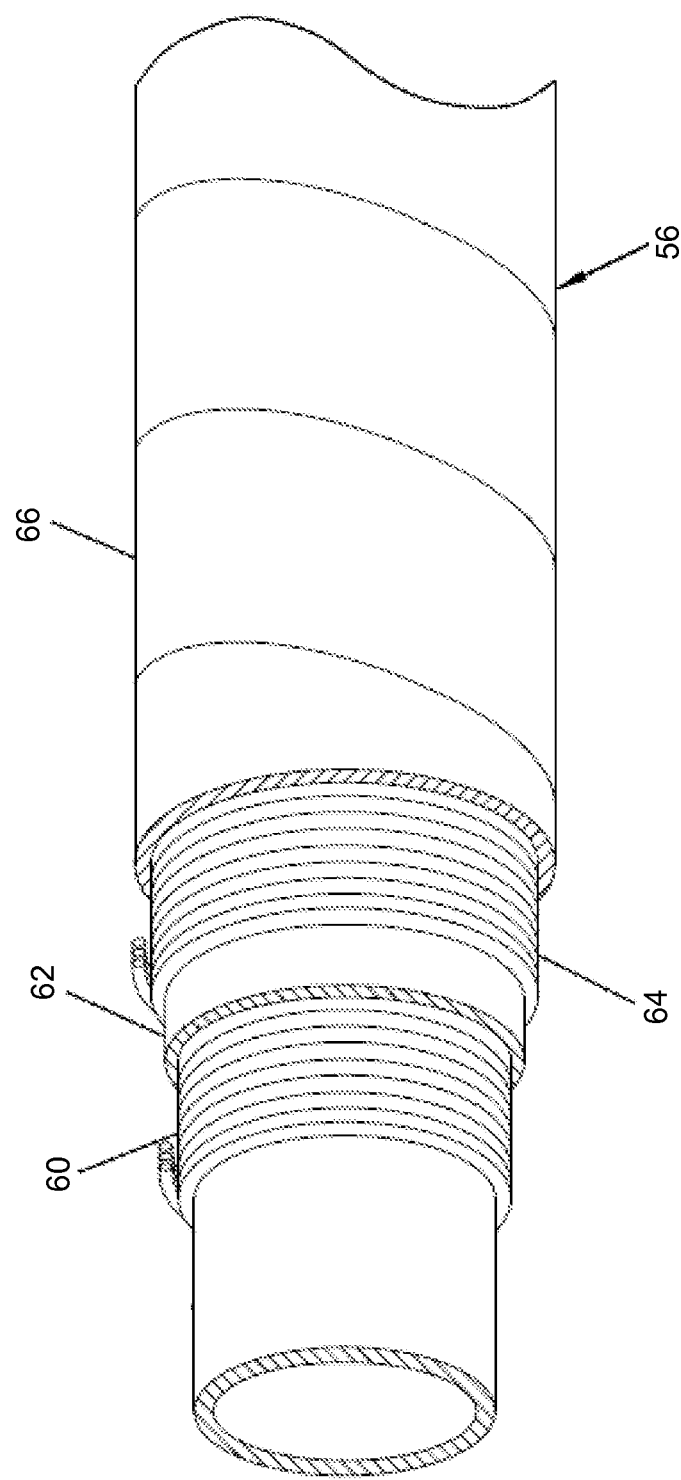
FIG. 9 is a perspective view, partially cut away, illustrating an exemplary hose employing a spiral wire conducting layer that is suitable for use with the hose assembly of FIG. 7.

Referring now to FIGS. 8 and 9, the first and second conductive layers 60, 64 may include, for example, an electrically conductive braided reinforcement material, such as shown in FIG. 8, or alternating layers of electrically conductive spiral reinforcement material, such as shown in FIG. 9. The braided reinforcement material may consist of a single layer or may include multiple layers. Although a two-wire spiral reinforcement arrangement is depicted in FIG. 9, it shall also be appreciated that other configurations, such as four and six wire arrangements, may also be utilized.

In general, additional details regarding the construction of an example hose assembly 12 are provided in U.S. patent application Ser. No. 13/458,691, filed on Apr. 27, 2012, and entitled "Degradation Monitoring System for Hose Assembly", the disclosure of which was previously incorporated by reference in its entirety.

Figure 10A:
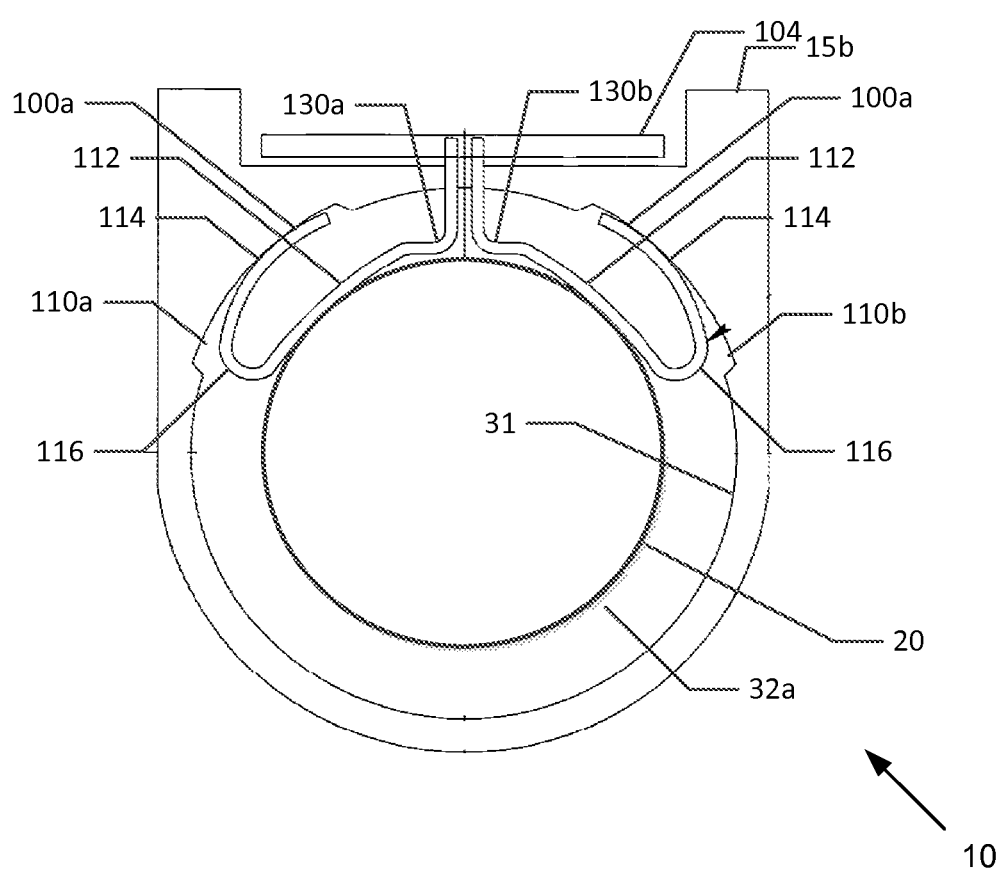
FIG. 10A is a cross-sectional view of the hose assembly and monitoring assembly of FIGS. 1-3 and particularly at plane A of FIG. 3, illustrating electrical connection of a first flexibly resilient conductive lead to the hose assembly.
Figure 10B:
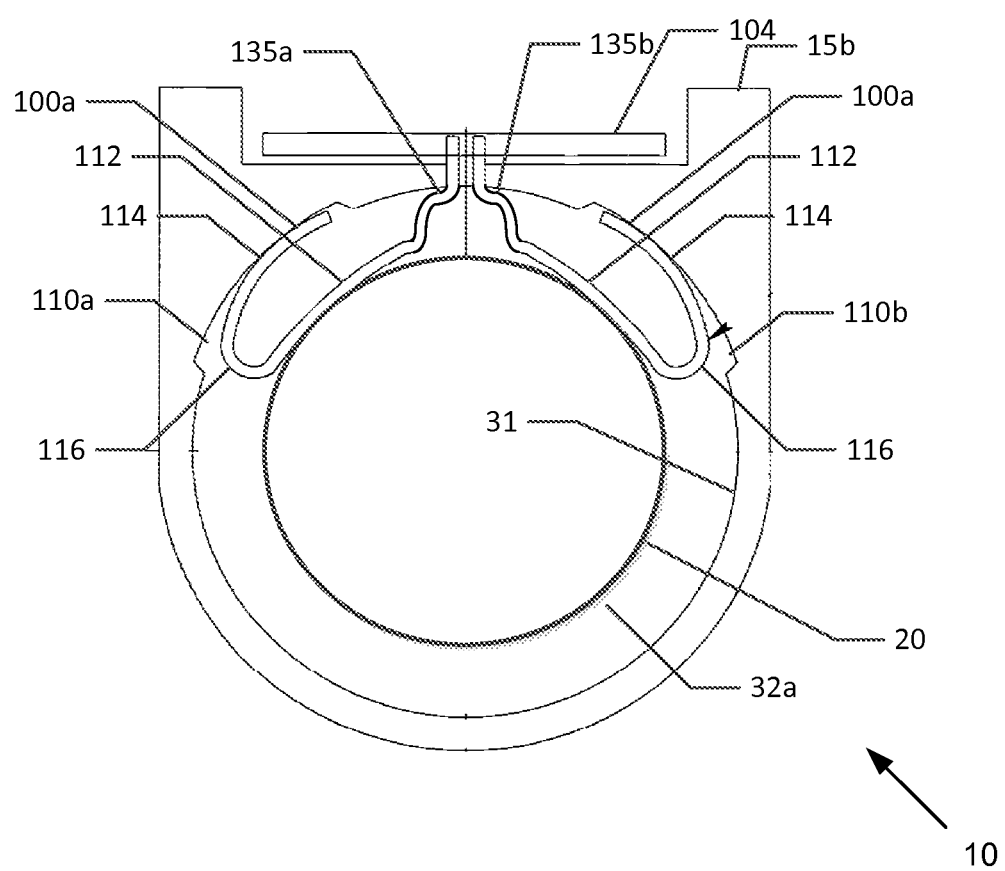
FIG. 10B is a cross-sectional view of the hose assembly and monitoring assembly of FIGS. 1-3 and particularly at plane A of FIG. 3, illustrating electrical connection of a first flexibly resilient conductive lead to the hose assembly, according to an alternative embodiment.
Figure 11:
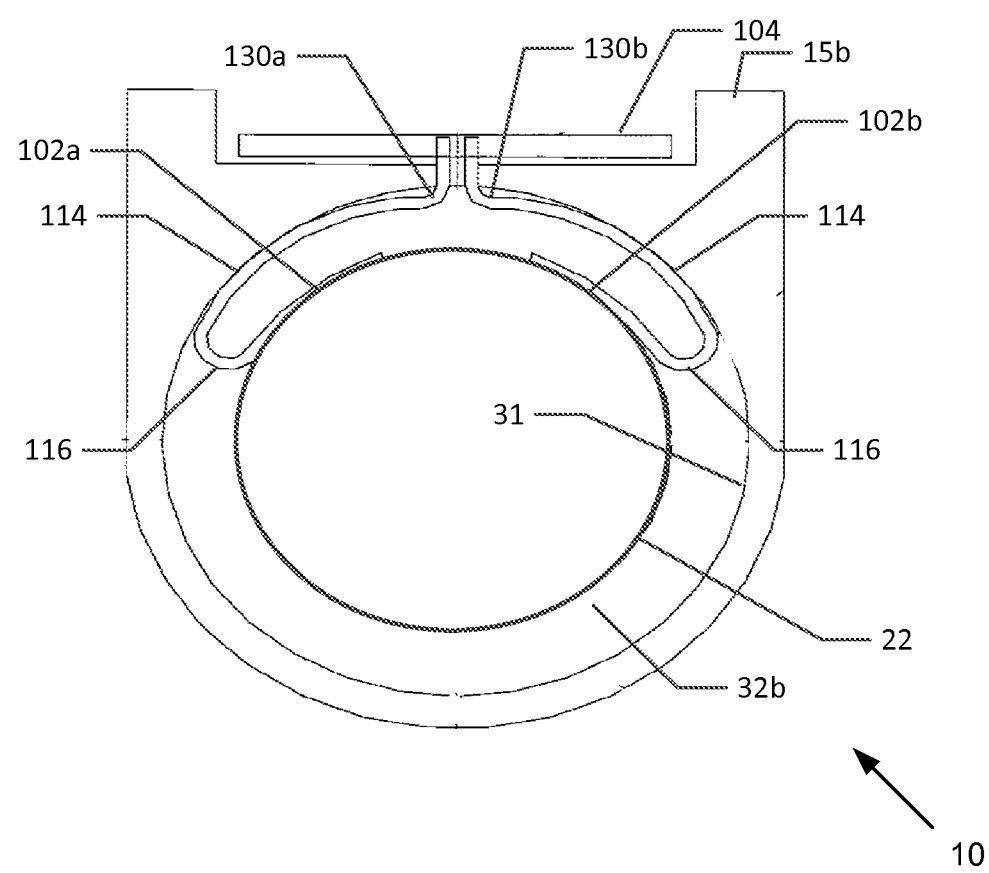
FIG. 11 is a cross-sectional view of the hose assembly and monitoring assembly of FIGS. 1-3, and particularly at plane B of FIG. 3, illustrating electrical connection of a second flexibly resilient conductive lead to the hose assembly.
Figure 12:
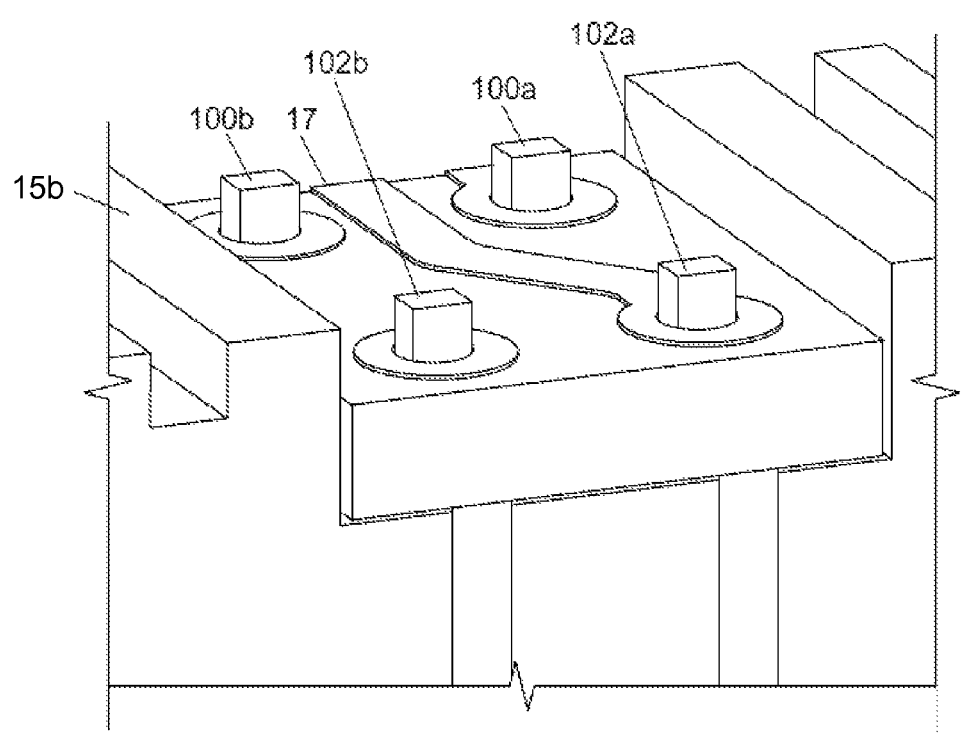
FIG. 12 illustrates electrical connection of flexibly resilient conductive leads to a circuit board within the monitoring assembly.

Referring now to FIGS. 10-12, details regarding interconnection of the monitoring assembly 14 to the hose assembly 12 are provided. In general, and as seen specifically in FIGS. 10A-10B and 11, interconnection of these assemblies is provided by flexibly resilient conductive leads 100*a-b* and 102*a-b* positioned along an interior surface 31 of the hollow cylindrical monitoring assembly 14, such that when the monitoring assembly 14 is mounted to the hose assembly 12, the flexibly resilient conductive leads 100*a-b*, 102*a-b* electrically interconnect to the tapered section 20 and narrowed extension 22, respectively, and consequently to layers 60, 64 of a hose assembly 12.

FIGS. 10A-10B and FIG. 11 show cross-sectional views of the flexibly resilient conductive leads 100*a-b*, 102*a-b*, housing portion 15, and hose assembly 12 at cross sections A and B of FIG. 3, respectively, according to example embodiments. In the embodiments shown in FIG. 10A-10B, a first set of flexibly resilient conductive leads 100a-b are electrically connected to the tapered section 20, while in FIG. 11, a second set of flexibly resilient conductive leads 102a-b are electrically connected to the narrowed extension 22. As seen in both FIGS. 10A-10B and FIG. 11, both sets of leads extend to a circuit board 104. However, it is understood that in an alternative embodiment, the first set of flexibly resilient conductive leads 100a-b could be electrically connected to the narrowed section 22 and the second set of flexibly resilient conductive leads 102a-b could be electrically connected to the tapered section 20, with both sets of leads extend to a circuit board 104.

The flexibly resilient conductive leads 100a-b, 102a-b are generally metallic or otherwise conductive elements formed from a generally flexible, but resilient material. Each of the flexibly resilient conductive leads 100a-b, 102a-b generally is constructed to have at least one bend point 116. In the embodiment shown, the bend point 116 of each of the leads 100a-b, 102a-b provides a flexion point at which the respective lead can flex, with the amount of flex being based at least in part on the material selected for the lead, the radius of the bend point 116, and the dimensions (e.g., thickness) of the leads. Although in the embodiment shown a single, u-shaped bend point is provided, in alternative embodiments, more than one bend point, or bend points of a different shape (e.g., having a point or "wishbone" shape) could be used as well.

When installed within an integrated hose assembly 10 as illustrated in FIGS. 10A-10B and FIG. 11, the flexibly resilient conductive leads 100a-b, 102a-b are biased into contact along the circumference of the hose assembly 12 at the tapered section 20 and narrowed extension 22, respectively. In such an arrangement, the flexibly resilient conductive leads 100a-b, 102a-b are compressed or lightly biased against the tapered section 20 and narrowed extension 22, respectively, by radial pressure applied by the housing 15, thereby ensuring continued contact between the flexibly resilient conductive leads 100a-b, 102a-b and the tapered section 20 and narrowed extension 22. The flexibly resilient nature of the leads 100a-b, 102a-b, combined with the bend point 116, allows the leads to maintain electrical contact even if the distance between the housing 15 of the monitoring assembly 14 and the tapered section 20 or narrowed extension 22 of the hose assembly 12 changes or is not calculated with precision. For example, in some cases, a diameter of the hose assembly at tapered section 20 or narrowed extension 22 may vary in different hose assemblies, and additionally an interior diameter of the housing 15 may vary. By using the flexibly resilient conductive leads 100a-b, 102a-b disclosed herein, a wide tolerance in differing sizes and/or shapes of the overall assembly 10 is possible.

As seen in FIGS. 10A-10B and FIG. 11, an interior surface 31 of the monitoring assembly includes a plurality of channels 32a-b extending circumferentially at least partially around the interior surface 31 of the monitoring assembly 14. The channels 32a-b are, in some embodiments, offset from one another to accommodate the different radii of the hose assembly at the tapered section 20 and narrowed extension 22. The channels 32a-b generally receive at least a portion of the flexibly resilient conductive leads 100a-b, 102a-b, respectively, and maintain alignment with the tapered section 20 and the narrowed extension 22 respectively when the monitoring assembly 14 is mounted on the hose assembly 12. In other words, the channels 32a-b prevent unintentional axial movement of the flexibly resilient conductive leads 100a-b, 102a-b, which may cause a shorting, electrical disconnection, or other electrical malfunction if connection is made across the tapered section 20 and narrowed extension 22, or if connection is entirely lost to one of those surfaces. Additional details regarding the construction of the channels 32a-b and the interior surface 31 of the monitoring assembly 14 are provided in U.S. Provisional Patent Application No. 61/701,307, filed on Sep. 14, 2012, and entitled "Wave Contact Arrangement for Hose Assembly," the disclosure of which is hereby incorporated by reference in its entirety. In some embodiments of the present disclosure, such as those seen in FIGS. 10A-10B and FIG. 11 the flexibly resilient conductive leads 100a-b, 102a-b are arranged within the channels 32a-b to provide radial overlap. Radial overlap is attained when the flexibly resilient conductive leads 100a-b, 102a-b are crossed at least twice by a line is extended radially outward from the tapered section 20 or the narrowed extension 22 to the housing 15. In other words, the flexibly resilient conductive leads 100a-b, 102a-b each fold back over themselves at the bend point 116. In particular, in alternative embodiments, other geometries of the flexibly resilient conductive leads could be provided as well.

The circuit board 104 includes at least a portion of a monitoring circuit used to detect whether a failure of the hose has occurred, based on a change of an electrical characteristic of the hose due to introduction of voltage across the layers 60, 64 based on a voltage across the tapered section 20 and narrowed section 22. Examples of possible circuits used on the circuit board 104 to detect hose failures are discussed in U.S. patent application Ser. No. 13/458,691, filed on Apr. 27, 2012, and entitled "Degradation Monitoring System for Hose Assembly", which was previously incorporated by reference, and U.S. Provisional Patent Application No. 61/701,325, entitled "Sense and Hold Circuit for Hose Assembly", and filed on Sep. 14, 2012, the disclosure of which is also incorporated by reference herein in its entirety.

As further seen in FIGS. 10A-10B and FIG. 11, the flexibly resilient conductive leads 100a-b, 102a-b each include a first surface 112 and a second surface 114 with the first surface 112 and the second surface 114 separated by the at least one bend point 116. The first surface 112 is the surface of the flexibly resilient conductive lead 100a-b, 102a-b that is closest to the connection with the circuit board 104. The second surface 114 is the surface of the lead 100a-b, 102a-b that follows the bend point 116 and is furthest from the connection with the circuit board 104. The first surface 112 and second surface 114 may be configured to contact the hose assembly 12 and the housing 15 of the monitoring assembly 14 in a variety of configurations. In embodiments seen in FIGS. 10A-10B, the first surface 112 of the leads 100a-b maintains contact with the tapered section 20 and the second surface 114 maintains contact with the housing 15. As seen in FIG. 11, the first surface 112 of leads 102a-b maintains contact with the housing 15 and the second surface 114 maintains contact with the narrowed section 22. Embodiments may also be constructed where the first surface 112 of leads 102a-b maintains contact with the narrowed section 22 and the second surface 114 of leads 100a-b maintains contact with the inner surface 31 of the housing 15, or in which the first surface 112 of the leads 100a-b maintains contact with the inner surface 31 of the housing 15 and the second surface 114 maintains contact with the tapered section 20.

In comparing the embodiment shown in FIGS. 10A-10B, it is noted that leads 100a-b include bend points 130a-b in FIG. 10A, respectively, at which the leads 100a-b are bent after extending into the housing 15 from the circuit board 104. In the example shown in FIG. 10A, the bend point is relatively closer to the tapered section 20 than to an interior surface of the housing 15. By way of contrast, bend points 135a-b of FIG. 10B are positioned closer to the interior surface of the housing 15 than to the tapered section. The example configuration of FIG. 10B may be used to control an insertion depth of the leads 100a-b through the housing 15 and into the circuit board 104, because in some cases the leads 100a-b as shown in FIG. 10A may be inserted to too great a depth through the circuit board, causing undue deformation of the leads or stress on the circuit board 104.

FIGS. 10A-10B also show embodiments in which the housing 15 has recessed cavities 110a-b. The recessed cavities 110a-b allow for greater distance between the inner surface 31 of the housing 15 and the tapered section 20. In an alternative embodiment of the invention as seen in FIG. 11, the housing 15 may be constructed without the recessed cavities when a shorter travel distance between the housing 15 and the tapered section 20 is desirable. Varied travel distances between the housing 15 and the tapered section 20 may be based on the particular application for which the hose is being used or the materials from which the hose assembly 12 or housing 15 are constructed. Alternative embodiments of the invention may be constructed where the recessed cavities 110a-b are included in channel 32b, thereby allowing for greater travel distance between the housing 15 and the narrowed section 22.

It is noted that, in various embodiments, each of the different contact arrangements seen in the cross-sectional view of FIGS. 10A-10B and FIG. 11 may be employed at plane A or plane B of FIG. 3. In one embodiment, a housing 15 including recessed cavities 110a-b at plane A of FIG. 3 and lacking recessed cavities at plane B of FIG. 3 may be used. In another embodiment of the invention, a housing lacking recessed cavities at plane A of FIG. 3 and including recessed cavities 110a-b at plane B of FIG. 3 may be used. A housing 15 may also contain recessed cavities 110a-b at both planes A and B of FIG. 3. A housing 15 may also be constructed lacking recessed cavities at both planes A and B of FIG. 3.

Referring to FIGS. 10A-10B and FIG. 11 generally, it is noted that although a particular geometry and size of flexibly resilient conductive leads 100a-b,102a-b are disclosed herein, other sizes or geometries of flexibly resilient conductive leads could be used as well. For example, a flexibly resilient conductive leads to be used with a hose having a larger radius would have a less pronounced overall curvature, to accommodate the circumferential shape of that hose. Furthermore, such a flexibly resilient conductive lead may be constructed to be generally wider or narrower to accommodate a particular surface of the hose, or longer or shorter to electrically connect to the hose and accommodate the geometry of the housing 15 of the monitoring assembly 14 as well.

As seen most clearly in FIGS. 6 and 12, in the example embodiment shown, the housing 15 has a removable cover 17 that, when removed, allows access to the circuit board 104. This allows for maintenance of the circuit board, or electrical testing, interconnection, or replacement of the circuit board 104 as may be required over the life of the hose. In some embodiments, the circuit implemented by the circuit board 104 is generally a low-power circuit that operates using battery power, and as such the cover 17 can be removed in the case where the battery is required to be changed.

Referring to FIGS. 1-12 generally, it is noted that use of the flexibly resilient conductive leads disclosed herein provides a number of advantages over existing electrical connection schemes used in connection with hose assemblies. For example, the natural compressive resiliency against surfaces of the hose assembly provides a more reliable electrical connection to the hose assembly 12. This resilience is especially desirable when the distance between the hose assembly 12 and the housing 15 of the monitoring assembly 14 is not calculated with precision or has shifted due to wear and/or use because the flexibly resilient conductive leads can provide continuous electrical contact over a variable distance.

Furthermore, and in particular in the case where the flexibly resilient conductive leads 100a-b, 102a-b are used to electrically connect to a generally circular surface, the overall monitoring arrangement can be rotated around the axis of the hose assembly when mounted, which provides a number of additional advantages. For example, convenient access to the circuit board 104 via cover 17 can be provided, irrespective of the orientation of the hose assembly when mounted and in use. In one embodiment of the invention, the flexibly resilient conductive leads 100a-b, 102a-b have a fixed position relative to the monitoring assembly 14 and are rotatable relative to the hose assembly 12. Rotation of the monitoring assembly 14 around the hose assembly 12 has a natural, light abrasive effect between the flexibly resilient conductive leads 100a-b, 102a-b and the tapered section 20 or narrowed section 22. This light abrasive effect can be used periodically to clean the contact points between the flexibly resilient conductive leads and surfaces, thereby allowing a user of such an assembly 10 to attempt to fix electrical connectivity issues during use of the integrated hose assembly 10 by rotating the monitoring assembly, for example in the event of corrosion of the leads 100a-b, 102a-b, or in the event of debris between a lead and conductive surfaces of tapered section 20 and narrowed section 22.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An integrated hose assembly with monitoring comprising:
    a hose assembly including a hose having a first conductive layer and a second conductive layer, the first conductive layer electrically connected to a nipple and the second conductive layer electrically connected to a socket, and wherein the first and second conductive layers are separated by an insulating layer;
    a monitoring assembly comprising:
        a housing rotatably mounted around at least a portion of the hose assembly;
        a first flexibly resilient conductive lead seated within the housing
        and electrically contacting a first outer surface of the hose assembly such that the first flexibly resilient conductive lead is electrically connected to a nipple;
        a second flexibly resilient conductive lead seated within the housing and electrically contacting a second outer surface of the hose assembly such that that the second flexibly resilient conductive lead is electrically connected to a socket; and a monitoring circuit electrically connected to the first flexibly resilient conductive lead and the second flexibly resilient conductive lead;

wherein the first and second flexibly resilient conductive leads each include a first and second surface with a bend point between the first and second surfaces.

2. The integrated hose assembly of claim 1, wherein the first surface of the first flexibly resilient conductive lead is biased to maintain contact with the first outer surface of the hose assembly and the second surface of the first flexibly resilient conductive lead is biased to maintain contact with a first inner surface of the housing.

3. The integrated hose assembly of claim 2, wherein the first surface of the second flexibly resilient conductive leads is biased to maintain contact with the second outer surface of the hose assembly and the second surface of the second flexibly resilient conductive lead is biased to maintain contact with a second inner surface of the housing.

4. The integrated hose assembly of claim 3, wherein the first and second inner surfaces of the housing are spaced apart along a length of the hose assembly.

5. The integrated hose assembly of claim 1, wherein the first and second surfaces and the bend point form a radially overlapping u-shaped section of each of the first and second flexibly resilient conductive leads.

6. The integrated hose assembly of claim 1, wherein the first outer surface and the second outer surface of the hose assembly are electrically separated by the insulating layer.

7. The integrated hose assembly of claim 1, wherein the first flexibly resilient conductive lead and the second flexibly resilient conductive lead are axially and radially offset from one another.

8. The hose assembly of claim 1, wherein the first and second flexibly resilient conductive leads have a fixed position relative to the monitoring circuit and are rotatable relative to the hose assembly.

9. A monitoring assembly comprising:
a housing rotatably mountable around at least a portion of a hose assembly having first and second electrically conductive outer surfaces forming contact points for an electrical circuit including the hose assembly;
a first flexibly resilient conductive lead seated within the housing and electrically contacting a first outer surface of the hose assembly such that the first flexibly resilient conductive lead is electrically connected to a nipple;
a second flexibly resilient conductive lead seated within the housing electrically contacting a second outer surface of the hose assembly such that that the second flexibly resilient conductive lead is electrically connected to a socket; and
a monitoring circuit electrically connected to the first flexibly resilient conductive lead and the second flexibly resilient conductive lead;
wherein the first and second flexibly resilient conductive leads each include a first and second surface with a bend point between the first and second surfaces.

10. The monitoring assembly of claim 9, wherein the first surface of the first flexibly resilient conductive lead is biased to maintain contact with the first outer surface of the hose assembly and the second surface of the first flexibly resilient conductive lead is biased to maintain contact with a first inner surface of the housing.

11. The monitoring assembly of claim 10, wherein the first surface of the second flexibly resilient conductive leads is biased to maintain contact with the second outer surface of the hose assembly and the second surface of the second flexibly resilient conductive lead is biased to maintain contact with a second inner surface of the housing.

12. The monitoring assembly of claim 9, wherein the housing includes a first channel configured to retain the first flexibly resilient conductive lead and a second channel configured to retain the second flexibly resilient conductive lead.

13. The monitoring assembly of claim 9, further comprising third and fourth flexibly resilient conductive leads, the third flexibly resilient conductive lead electrically contacting the first outer surface of the hose assembly and the fourth flexibly resilient conductive lead contacting the second outer surface of the hose assembly.

14. The monitoring assembly of claim 9, wherein the monitoring circuit is configured to apply a voltage across the first and second conductive outer surfaces, there applying a voltage across first and second conductive layers of a hose assembly.

15. The monitoring assembly of claim 9, wherein the first and second flexibly resilient conductive leads have a fixed position relative to the monitoring circuit and are rotatable relative to the hose assembly.

16. The monitoring assembly of claim 9, wherein the first and second flexibly resilient conductive leads are constructed of an electrically conductive material.

17. A method of contacting a monitoring assembly to a hose assembly, the method comprising:
rotatably mounting a housing of a monitoring assembly around at least a portion of a hose assembly, thereby electrically contacting a first electrically conductive outer surface of the hose assembly with a first flexibly resilient conductive lead and electrically contacting a second electrically conductive outer surface of the hose assembly with a second flexibly resilient conductive lead, the first and second flexibly resilient conductive lead each electrically connected to a monitoring circuit within the housing, wherein the first and second flexibly resilient conductive leads each include a first and second surface with a bend point between the first and second surfaces.

18. The method of claim 17, further comprising rotating the monitoring assembly around the hose assembly, thereby scraping the first and second flexibly resilient conductive leads across the first and second outer surfaces.

19. The method of claim 17, wherein scraping the flexibly resilient conductive leads removes debris positioned between the first and second flexibly resilient conductive leads and the respective first and second electrically conductive outer surfaces of the hose assembly.

* * * * *